Figure 1:
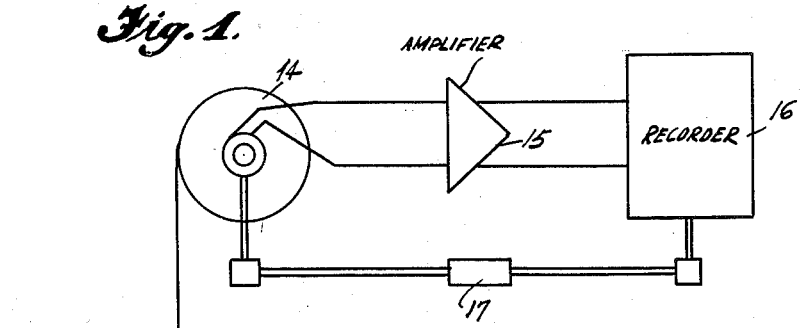

July 18, 1950 R. E. FEARON ET AL 2,515,501
NEUTRON WELL LOGGING
Filed June 29, 1948 2 Sheets-Sheet 1

INVENTOR.
GILBERT SWIFT,
BY ROBERT E. FEARON AND
JEAN M. THAYER
James Y. Cleveland
ATTORNEY

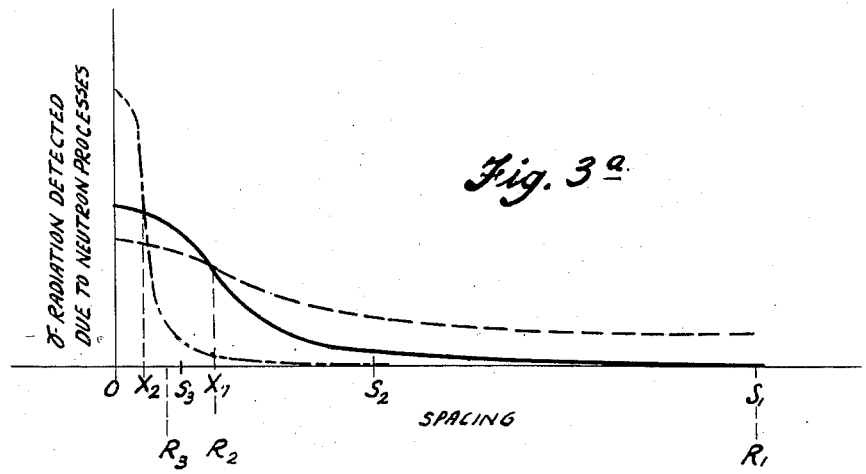
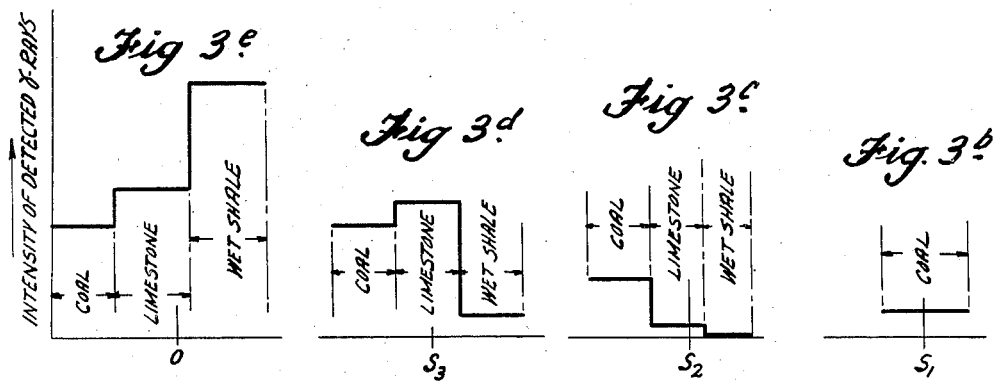

Patented July 18, 1950

2,515,501

UNITED STATES PATENT OFFICE 2,515,501

NEUTRON WELL LOGGING

Robert E. Fearon, Jean M. Thayer, and Gilbert Swift, Tulsa, Okla., assignors to Well Surveys, Incorporated, Tulsa, Okla., a corporation of Delaware Application June 29, 1948, Serial No. 35,818

1 Claim. (Cl. 250—83.6)

This invention relates to the art of subsurface exploration, principally oil well logging, and more particularly to a radioactivity type of exploration in which a source of fast neutrons is used in conjunction with a gamma-ray detector. Commercially such a radioactivity log made by the use of a source of fast neutrons and a gamma-ray detector is known as a neutron log. This is true despite the fact that no neutrons are directly detected.

In recent years neutron oil well logs have achieved a degree of popularity not shared by the logs made by other methods. This is believed to be attributable to the fact that, in a substantial proportion of surveys made, they correlate more accurately with the lithology of the strata penetrated by the well. These logs have been made by traversing the well with a source of neutrons, usually 300 to 500 millicuries of radium intimately mixed with a predominant proportion by weight of powdered beryllium, to irradiate with fast neutrons the strata lining the well and simultaneously traverse the well with an associated gamma-ray detector to detect and record gamma rays in correlation with the depth at which they are detected. The detector, for example an ionization chamber, and the source are assembled to make a single unit, with the detector vertically spaced from the source.

By extensive experimentation we have discovered that the neutron log does not in many important instances adequately depict the lithologic properties of the strata surveyed. We have carefully investigated and correlated numerous instances of this kind and, as a result of exhaustive study and experimentation, we believe that we have now found the solution to this problem and have discovered how to make adequate neutron logs of oil wells, and analogous subsurface passages, in virtually all instances.

We have found that the desired effect originating in different subsurface formations can be selectively augmented, and that this can be accomplished by regulating the distance between the neutron source and the detector. That is, if we are seeking to locate a certain type of underground strata, we have discovered how to emphasize on the neutron log the presence of that particular strata. This distance above mentioned is critical, and from the point of view of useful gamma radiation produced by neutron reactions in the strata, we have found that it varies with the number of neutrons emitted by the source per unit of time and the average range of the neutrons in the formations adjacent the well. The range of neutrons in formations depends on the lithological properties of the formations. For example, in a dry formation, such as dry coal, the range of neutrons therein would be greater than the range of neutrons in a wet formation, such as a wet shale. The range of neutrons in a limestone would lie between the ranges for neutrons in dry coal and in wet shale. We have discovered that the intensity of detected gamma radiation from a particular formation is optimum when the spacing of the neutron source from the detector is of the order of, but not greater than, the neutron range in that formation. If we wish to emphasize the transitions in the log due to variations in a particular type of formation, we use a spacing between the source and the detector that is of the order of, but not greater than the range of neutrons in that particular formation. From the geological history of the subsurface strata in a particular area we can anticipate what formations are likely to be encountered in the well and can select a spacing between neutron source and detector which will be most favorable to the differentiation between the particular strata in which we are interested. Generally speaking, if we desire to differentiate between wet and very wet formations a relatively small spacing would be used between the neutron source and detector. On the other hand, if we desire to differentiate between a dry formation, such as coal, and a limestone, a greater spacing would be used. Taking these facts into consideration, we have found that in order to make a single log of a well which portrays the maximum information, a satisfactory spacing between the neutron source and detector can usually be selected which is a compromise for all formations of interest that it is expected to encounter in the drill hole.

The primary object of this invention is the provision of method and apparatus for augmenting selectively on the neutron log transitions indicative of different subsurface formations. It is an object to emphasize on the log the presence of a particular formation deemed to be of special interest. It is a particular object of the invention to accomplish this by regulating the spacing between source and detector. It is a specific object to detect a particular formation by spacing the source and detector a distance of the order of, but less than, the range of neutrons in that formation. It is also an object to provide a compromise spacing, based on the foregoing considerations, which will enable satisfactory differentiation between and location of various formations of interest.

Figure 2:
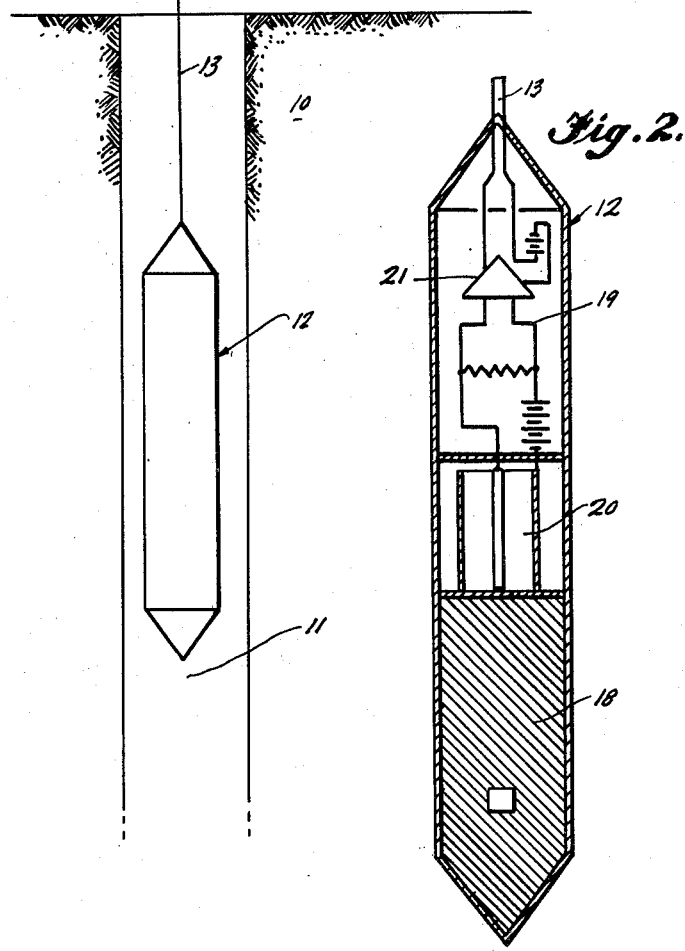

Other objects and advantages of the present invention will become apparent from the following detailed description when considered with the drawings, in which Figure 1 is a diagrammatic illustration of a neutron logging operation;

Figure 2 is an enlarged vertical sectional view of the subsurface instrument; and Figures 3a to 3e illustrate the effect of varying the spacing of the neutron source from the detector on the useful detected gamma radiation which has been produced in different kinds of formations.

Referring to the drawings in detail, particularly Figure 1, there is illustrated a well surveying operation in which a fragment of the surface 10 of the earth is shown in vertical section. A well 11 penetrates the earth's surface and may or may not be cased. Disposed within the well is the subsurface instrument 12 of the well logging system which additionally comprises a cable 13 for suspending the instrument in the well, a drum 14 from which cable is paid out or on which cable is wound when causing the capsule 12 to traverse the well, electrical connections from slip-rings on the axle of the drum 14 to an amplifier 15, which in turn is electrically connected to a recorder 16 in a conventional manner. Recorder 16 is driven through a transmission 17 by the drum 14 as the cable is paid out from or wound thereon. The record thus made by the recorder as the capsule 12 traverse the drill hole will be in correlation with depth.

As shown in Figure 2, the capsule 12 comprises a neutron source 18 forming the bottom portion thereof and a gamma-radiation detecting system indicated generally as 19 which makes up the upper portion of the capsule. The gamma-radiation detecting equipment 19 can be such as that disclosed in the Scherbatskoy et al. Patent No. 2,349,225 or such as that shown in the Scherbatskoy Patent No. 2,390,965. For purposes of describing this invention an ionization chamber 20 is shown as the radiation sensitive element. As disclosed in the Fearon Patent No. 2,308,361, the operation of a system of this character when producing a neutron log is that the capsule 12, made up of a source of neutrons 18 and a gamma-radiation detection system 19, is caused to traverse a well. Neutrons emitted from the source enter the walls of the well and by nuclear reaction with matter contained in the walls, produce gamma radiation in amounts proportional to the lithological characteristics of the materials of which the walls are formed. These gamma radiations produced by nuclear reactions in the strata are detected by the gamma-radiation detector 20 by producing electrical signals that are related in magnitude to the intensity of the gamma radiation detected, and these signals are amplified by an amplifier 21 and transmitted over conductors contained in the cable 13 to the surface of the earth, where if necessary, they are further amplified by the amplifier 15 and recorded by the recorder 16 in correlation with the depth at which they were detected.

It is to be understood that any conventional well-logging gamma-radiation detecting and recording system can be employed in conjunction with a proper neutron source while practising that form of the present invention in which a neutron log is made directly.

We have found that the desired effect, that produced by gamma radiation which has originated with neutron reactions in the formations, can be augmented by using a source which emits a predetermined large quantity of neutrons per second, for example $5 \times 10^6$ per second, spaced relatively close to the detector to favor the detection of a maximum intensity of gamma radiation which is produced in the formations by neutron processes therein. The spacing is critical and, from the point of view of useful gamma radiation produced by neutron reactions in the strata, varies with the type of source used, or more accurately, with the neutron flux and the average range of the neutrons in the formations adjacent the well. This is illustrated in Figures 3a to 3e. In Figure 3a there is shown a group of curves which have been plotted with spacing of source from detector as abscissa and intensity of gamma rays reaching the detector as a result of neutron processes occurring in the formations as ordinates. The dotted curve represents the intensity of gamma radiation reaching the detector and which has been produced in pure dry coal, such as anthracite. The solid curve represents the intensity of gamma radiation reaching the detector and which has been produced by neutron reactions in limestone, and the dash-dot curve represents the intensity of gamma radiation reaching the detector and which has been produced in wet shale. The range of neutrons in each of the formations represented by the curves is measured from the vertical axis to the right along the horizontal axis and identified by R1, R2 and R3. It is to be understood that these ranges as shown on the curves are not intended to be absolute values but relative values which will serve equally well for purposes of explanation. By comparing the ranges R1, R2 and R3 with the magnitude of the gamma ray intensity curve at the respective ranges, it can be seen that the maximum intensity of gamma radiation, which originates in the strata, reaching the detector can be detected when the distance between the neutron source and detector is less than, but of the order of this range. Now consider a detector located at zero of the coordinate system and a source spaced a distance S1 from the detector. Practically all the gamma radiation detected which has arisen from neutron reactions in the formations will be those originating with neutron reactions in the pure dry coal. The intensity of this detected gamma radiation may be measured as the vertical distance between the horizontal axis and the dotted curve. Next consider the condition where the detector is located at zero and the neutron source is located at the point S2 on the horizontal axis of the coordinate system. Under this condition the magnitude of the intensity of gamma radiation reaching the detector from the coal has more than doubled and the intensity of gamma radiation which has originated in the limestone can also be detected. Making the spacing still shorter by moving the neutron source to the point S3 on the coordinate system, it will be seen that gamma radiation originating in three formations can now be detected, gamma radiation from the dry coal, the limestone and from a wet shale. When the neutron source is moved from S2 to S3 the intensity of gamma radiation from limestone will be the largest and that from dry coal next largest, while the intensity of gamma radiation from the wet shale will be very small. Next consider zero spacing, that is, where the neutron source is located in the center of the effective portion of the detector. It is appreciated that such a condition could not easily be attained due to the unattenuated gamma radiation given off by the neutron source. However, the assumed condition is helpful in illustrating the effect of spacing on the intensity of detected gamma radiation which has originated in the formations as result of neutron reactions therewith. Under these conditions the intensity of the gamma radiation originating in the wet shale will be quite large and will be the most prominent of the detected gamma radiation. The intensity of gamma radiation detected which has originated in the limestone will be next largest, while the intensity of gamma radiation which has originated in the dry coal will be the smallest. These curves serve to clearly illustrate the fact that, from the point of view of intensity of gamma radiation detected which has originated in the formations, the intensity is greatest for a particular formation when the space between the detector and neutron source is less than but of the order of the range of neutrons in that formation. An important point to be noted is that the three curves representing different geological formations cross as the spacing decreases from a large spacing to a relatively small or zero spacing. This teaches that if one desires to have the characteristics of dry coal predominate in the log, then the detector-source spacing must not be less than zero to X1 as measured along the horizontal axis of Figure 3a. If it is desired to emphasize the characteristics of limestone, then a spacing would be used which would lie between the intersection of the solid curve with the dotted curve and the intersection of the solid curve and the dashed curve between X1 and X2. If it is desired to emphasize in the log the characteristics of wet shale, then the spacing between source and detector should lie between the intersection of the solid curve and the dashed curve and zero between X2 and 0. Figures 3b, 3c, 3d and 3e serve to illustrate by fragments of logs the manner in which the recorder would be effected when traversing wet shale, limestone and dry coal formations in succession with particular detector-source spacings. Figure 3b shows the manner in which the recorder would respond to the intensity of gamma radiation detected with a source-detector spacing of zero to S1. The magnitude of displacement of the recorder pen is measured from the base line 0—0'. The recorder, as indicated, would show a single trace offset from the base line an amount proportional to the intensity of that gamma radiation produced in the dry coal and which has reached the detector. Figure 3c, made by the use of a detector-source spacing corresponding to 0—S2, shows a first displacement from the base line 0—0' that is caused by the gamma radiation which has originated in wet shale. This offset is followed by a second offset corresponding to detected gamma radiation which originated in the limestone. This offset is, in turn, followed by a third offset which represents the detected gamma radiation which originated in the dry coal. Figure 3d represents the recorder response when these same three formations are traversed in the same order by a detector having a source spaced from it by a distance equal to 0—S3. It is to be noted that the wet shale causes an offset in the recorder trace followed by a large offset due to the gamma radiation which originated in the limestone. This last offset is followed by one which is in the opposite direction, showing that the intensity of the gamma radiation reaching the detector and which has originated in the dry coal has fallen off. In other words, the critical spacing has been passed for recording characteristics of coal and now the emphasis is strongly on the gamma radiation which has originated in the limestone. Under the conditions where the detector and source would coincide or be spaced a zero distance apart, the recorder response would be as shown in 3e. In this figure the gamma radiation originating in the wet shale would predominate, that is, it would produce the greatest deviation of the recorder pen from the base line 0—0' for limestone. This offset would be followed by a negative offset, that is, one in the direction of the line 0—0'. The limestone offset, in turn, would be followed by that for coal, which is also in a negative direction. This figure shows that the critical spacing of source from detector has been passed for limestone and now the emphasis is on the wet shale. Although three formations have been used for purpose of illustration, it is to be understood that the particular formations that are expected to be encountered in a well are to be taken into consideration when adjusting the spacing between the neutron source and detector. From the picture presented above, it is clear that the closest spacing used need never be less than that point at which the last crossing occurs between the curve for materials of the type ordinarily encountered and that material in which the neutron range is apt to be shortest.

We have found that, in addition to providing a method and apparatus whereby different types of strata can be differentiated, by careful selection of source-detector spacin, we can differentiate between very small percentages of hydrogen content, hence the fluid content, of the formations that are otherwise the same.

In logging oil wells, the type of information which is generally of greatest interest is the variation of fluid content or other property in a given limestone or sandstone.

Again referring to Figure 3a, for purposes of explanation let the dashed curve be assumed to represent a limestone having 5% fluid content; the solid curve be assumed to represent the limestone having 10% fluid content, and the dash-dot curve represent a limestone having 20% fluid content.

In order that the neutron log respond clearly and definitely to small changes in the fluid content which it is desired to observe it is necessary to so choose the spacing between source and detector that no crossing occurs between the curves of the type of Figure 3a for any of the included varieties of the given limestone or sandstone which are to be differentiated. Best results will be obtained by choosing that spacing which maximizes the rate of change of detected radiation with variation in the property which is to be observed. Such a spacing is appreciably shorter than that at which the first crossing occurs or appreciably longer than that at which the last crossing occurs among the curves of the type shown in Figure 3a for any of the included varieties of the given type of strata.

For example, if it is desired to differentiate, on the log, fluid content in limestone ranging between 5% and 20%, a spacing lying between 0 and X2 but somewhat less than X2, or a spacing lying between X1 and S2 but appreciably greater than X1 should be chosen. It will be seen that if a spacing lying between X1 and X2 is chosen, an ambiguity results from the fact that curves corresponding with two different fluid contents in the range from 5% to 20% could be drawn which would cross at the spacing chosen. Therefore the gamma ray intensities caused by neutrons for rocks having these particular fluid contents would be equal, and these rocks, though different, would be represented as being the same.

It can be noted from Figure 3a that for a spacing such as S3 the curve for 5% fluid content of the formations lies between the curves for 20% and 10% and therewith leads to the inconsistency in which the gamma ray intensities are in the following order: The 10% fluid content provides the highest value, and both the 5% less and 20% least fluid contents provide lower intensities of gamma radiation.

We claim:

A method of making a neutron log of the formations penetrated by a well that comprises determining from known knowledge of the types of formations penetrated by the well a spacing that is of the order of but less than the average range of neutrons in the types of formations penetrated by the well, spacing the neutron source from the gamma ray detector a distance that is of the order of this average range, and making a neutron log of any sufficiently similar well while maintaining but less than this spaced relationship between the neutron source and detector.

ROBERT E. FEARON.
JEAN M. THAYER.
GILBERT SWIFT.

REFERENCES CITED

The following references are of record in the file of this patent:

UNITED STATES PATENTS

| Number | Name | Date |
|---|---|---|
| 2,469,462 | Russell | May 10, 1949 |

Certificate of Correction

July 18, 1950

Patent No. 2,515,501   ROBERT E. FEARON ET AL.

It is hereby certified that error appears in the printed specification of the above numbered patent requiring correction as follows:

Column 3, line 31, for the word "traverse" read *traverses*; column 6, line 34, for "spacin" read *spacing*; column 7, line 9, for "therewith" read *therefore*; column 8, line 6, after "maintaining" strike out "but less than" and insert the same before "this" in line 4, same column;

and that the said Letters Patent should be read as corrected above, so that the same may conform to the record of the case in the Patent Office.

Signed and sealed this 5th day of December, A. D. 1950.

[SEAL]

THOMAS F. MURPHY,
*Assistant Commissioner of Patents.*